(12) United States Patent
Schmidt et al.

(10) Patent No.: US 9,103,435 B2
(45) Date of Patent: Aug. 11, 2015

(54) DEVICE FOR OPERATING A TRANSMISSION APPARATUS HAVING A PLURALITY OF ELECTROHYDRAULICALLY ACTUATED FRICTION-FIT AND FORM-FIT SHIFT ELEMENTS

(75) Inventors: Thilo Schmidt, Meckenbeuren (DE); Christian Popp, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 569 days.

(21) Appl. No.: 13/444,962

(22) Filed: Apr. 12, 2012

(65) Prior Publication Data
US 2012/0272768 A1 Nov. 1, 2012

(30) Foreign Application Priority Data
Apr. 28, 2011 (DE) .......................... 10 2011 017 695

(51) Int. Cl.
*F16H 61/02* (2006.01)
*F16H 61/12* (2010.01)
*F16H 61/686* (2006.01)

(52) U.S. Cl.
CPC ............ *F16H 61/0206* (2013.01); *F16H 61/12* (2013.01); *F16H 61/686* (2013.01); *F16H 2200/2094* (2013.01); *Y10T 74/20024* (2015.01)

(58) Field of Classification Search
CPC ............ F16H 61/0209; F16H 61/0206; F16H 2061/1236; F16H 2061/1232; F16H 2061/1292
USPC ......... 475/127, 128, 133; 192/85.63; 251/213
See application file for complete search history.

(56) References Cited

U.S. PATENT DOCUMENTS

| | | | |
|---|---|---|---|
| 7,780,572 B2 | 8/2010 | Gierer et al. | |
| 8,070,636 B2 | 12/2011 | Gierer et al. | |
| 2009/0291802 A1 | 11/2009 | Herrmann et al. | |
| 2010/0081546 A1* | 4/2010 | Yoshioka et al. | 477/131 |
| 2010/0205522 A1* | 8/2010 | Ingersoll et al. | 715/229 |
| 2011/0009229 A1 | 1/2011 | Bauknecht et al. | |
| 2011/0028270 A1* | 2/2011 | Long et al. | 477/62 |
| 2012/0010794 A1* | 1/2012 | Sahashi et al. | 701/58 |

FOREIGN PATENT DOCUMENTS

| | | |
|---|---|---|
| DE | 10 2005 050 489 A1 | 4/2007 |
| DE | 10 2006 046 710 A1 | 4/2008 |
| DE | 10 2007 000 561 A1 | 4/2009 |
| DE | 10 2008 000 429 A1 | 9/2009 |

\* cited by examiner

*Primary Examiner* — Justin Holmes
*Assistant Examiner* — Stacey Fluhart
(74) *Attorney, Agent, or Firm* — David & Bujold, P.L.L.C.; Michael J. Bujold

(57) ABSTRACT

A mechanism for actuating a transmission having shifting elements. A self-holding valve device is movable into a first position, by a pilot pressure, against a force directed to a second position and held by a pressure holding signal in the first position. Transmission of a pressure signal, to a switching valve, is blocked by the self-holding valve device in the first position but, in the second position, is applied to the switching valve. When the driver sets the switching valve to a first shift position, the pressure signal can be applied to valve devices of at least two of the shifting elements that produce an actuating pressure and, in a second shift position of the switching valve, the onward transmission of the pressure signal, to the valve devices of the shifting elements that produce an actuating pressure, is blocked in the area of the switching valve.

12 Claims, 13 Drawing Sheets

| | A | B | C | D | E | F |
|---|---|---|---|---|---|---|
| "1" | X | | | X | | X |
| "2" | X | | X | | | X |
| "3" | X | X | | | | X |
| "4" | X | | | | X | X |
| "5" | X | X | | | X | |
| "6" | X | | X | | X | |
| "7" | X | | | X | X | |
| "8" | | | X | X | X | |
| "9" | | X | | X | X | |
| "R" | | X | | X | | |

DEVICE FOR OPERATING A TRANSMISSION APPARATUS HAVING A PLURALITY OF ELECTROHYDRAULICALLY ACTUATED FRICTION-FIT AND FORM-FIT SHIFT ELEMENTS

This application claims priority from German patent application serial no. 10 2011 017 695.0 filed Apr. 28, 2011.

FIELD OF THE INVENTION

The invention concerns a device for operating a transmission apparatus having a plurality of electro-hydraulically actuated friction-fit and form-fit shifting elements.

BACKGROUND OF THE INVENTION

With automatic transmissions known from prior practice, even after an electric transmission control system has been switched off or after a failure of the electric transmission control system it is still possible to continue operating a vehicle, to a limited extent, during a mechanical emergency operation mode of the automatic transmission. During such emergency operation at least one of the respective gear ratios available in the automatic transmission can be engaged as an emergency gear ratio. By virtue of the design of the planetary automatic transmission with power-shiftable friction shifting elements that are preferably acted upon by hydraulic pressure for torque transmission, the emergency gear ratio can be directly engaged even after initiating of the mechanical emergency operating mode. The emergency gear ratio is usually chosen depending on the current speed of the vehicle at the time. The transmission emergency concept, on which emergency operation is based, then depends on the transmission design concerned, and in various transmission systems no satisfactory emergency-running concept can be implemented.

With planetary automatic transmissions that are made with a hydraulic torque converter as the starting element, in the emergency-running mode when the emergency gear is engaged the vehicle can be set in motion again from rest by virtue of the torque converter. After re-starting a drive machine of a vehicle drive-train, as is known it is also provided that in planetary automatic transmissions, a higher emergency gear ratio compared with a previously engaged gear step can be engaged.

In contrast, in vehicles made with a dual clutch transmission with a wet starting clutch, starting processes during the mechanical emergency-running operation of the dual clutch transmission cannot be carried out, since the gear currently engaged in the dual clutch transmission cannot be changed on entry into the mechanical emergency operating mode. For that reason, if the speed of a motor falls below a lower rotational speed threshold or the vehicle speed falls below a certain value, the force flow in the area of the dual clutch transmission is interrupted.

With automated change-speed transmissions having a dry clutch system as well, re-starting of a vehicle from rest after the transition to emergency operation is not possible. This results from the fact that with such transmission systems, on transition to mechanical emergency-running operation the particular gear ratio step engaged in the automated transmission before the beginning of emergency operation cannot be disengaged and it is not possible to engage a desired emergency gear ratio. The motor of the vehicle built with an automated change-speed transmission will stall at the latest when the vehicle comes to rest in the event that the electric transmission control system fails.

Furthermore the possible design of the mechanical emergency-running operation of a transmission device also depends on an operating concept provided in the passenger compartment, by means of which a driver can, in each case, transmit to the transmission device corresponding indications regarding the desired operating status of the transmission device.

With so-termed mechanical operating concepts, the driver is usually provided with hydraulic slides in the transmission controls, with which the driver is able to convey his drive wishes at the time to the transmission. The driver's wish, indicated each time by the driver, regarding an operating condition to be obtained in the transmission device, such as the engagement of a gear for driving forward or in reverse, a parking operating condition in which a drive output is usually blocked mechanically and a force flow in the area of the transmission device is interrupted, or a neutral operating condition in which the drive output can rotate freely and the force flow in the area of the transmission device is interrupted as in the case of the parking operating condition, is determined in part electrically as a function of the position of a selector slide that can be actuated by the driver.

Electrical operating concepts that can be driver-actuated communicate driver's wish specifications to the transmission by means of purely electric signals. By corresponding electro-hydraulic actuators of the transmission device these are then appropriately implemented in accordance with the driver's wish, and the actuation of a parking lock also takes place electro-hydraulically.

Again, in the case of driver-actuated mixed concepts, the driver's wish is communicated to the transmission electrically, whereas the parking lock can be actuated by the driver mechanically.

Furthermore, so-termed electric motor operating concepts are also known, which correspond essentially to mechanical operating concepts and are additionally made with external actors by means of which the driver's wish, communicated in each case by mechanical means in mechanical operating concepts, is translated and implemented by electric motors into an actuation position equivalent thereto.

In general, to make automatic transmissions and particularly also planetary automatic transmissions more economically, shifting elements in the form of power-shiftable frictional shifting elements of the automatic transmissions are to an increasing extent being replaced by non power-shiftable shifting elements such as claw clutches, whereas it is necessary to carry out gear changes in such automatic transmissions without interruption of traction force. This can be done in a simple manner if the non power-shiftable or interlocking shifting element is in each case disengaged for gear changes in the direction of higher gears. In the case of downshifts during which the non power-shiftable shifting elements have to be engaged, the engagement process of a non power-shiftable shifting element is assisted by appropriate action of the motor or with the aid of further, frictional shifting elements not involved in the shifting sequence. In this way it is possible to circumvent the disadvantages of non power-shiftable or interlocking shifting elements which, in contrast to power-shiftable shifting elements, cannot themselves produce any synchronous condition and which, when subjected to torque, sometimes cannot be changed to an open operating condition.

The emergency-running concepts presently known do not enable transmission devices built with both frictional and interlocking shifting elements to be operated to the extent desired for making it possible to continue driving a vehicle after failure of an electric transmission control system, especially starting from when the vehicle is at rest, at least under limited power in order, for example, to make its way to a repair workshop without having to tow the vehicle.

SUMMARY OF THE INVENTION

Accordingly, the purpose of the present invention is to make available a mechanism for actuating a transmission device with a plurality of electro-hydraulically actuated frictional and interlocking shifting elements, by virtue of which the vehicle can continue to be driven, at least under limited power, even during emergency-running operation of the transmission device.

In the mechanism according to the invention for actuating a transmission device having a plurality of electro-hydraulically actuated frictional and interlocking shifting elements which, to obtain a gear ratio in the transmission device, can in each case be engaged in a force flow or disengaged from the force flow by applying an actuating pressure, the actuating pressures of the shifting elements can be set in the area of valve devices which can be acted upon by pilot pressures that can be adjusted by means of electrically actuated actors. As the control currents through the actors increase, the pilot pressures in each case adopt values between a minimum and a maximum value, such that the respective shifting elements are disengaged when the pilot pressures are at the minimum value and engaged when the pilot pressure are at the maximum value. In each case, when the actors are in the non-energized operating condition the respective pilot pressures adopt their minimum value.

According to the invention, a self-holding valve device is provided that can be acted upon by a pilot pressure acting in the direction of a first shift position and by a pressure holding signal, which can be moved by the pilot pressure to the first shift position against a control force that acts in the direction of a second shift position, and which can be held in a second shift position against the control force by the pressure holding signal. The passing on of a pressure signal in the direction toward a switching valve device is blocked in the area of the self-holding valve device when the self-holding valve device is in its first shift position, but it can be applied to the switching valve device when the self-holding valve is in its second shift position. If the driver has set the switching valve device to a first shift position, the pressure signal can be applied as a pilot pressure to valve devices of at least two of the shifting elements that produce an actuating pressure, whereas in a second shift position of the switching valve device the passing on of the pressure signal toward the valve devices of the shifting elements that produce the actuating pressure, is blocked in the area of the switching valve device.

With the mechanism according to the invention, during normal operation of a transmission device in which electrically actuated actors of an electric transmission control system that is functioning as it should are controlled by the control currents necessary in each case for producing a required operating condition of the transmission, it is ensured that the frictional and interlocking shifting elements of the transmission device can be acted upon in each case by the respective actuating pressures to be produced in accordance with the operating condition at the time.

In the event that the electric transmission control system of the transmission device fails, energizing of the electrically actuated actors is interrupted, whereby the pilot pressures that are produced by virtue of the electrically actuated actors adopt in each case their minimum value and the shifting elements all move to their disengaged operating condition.

The result is that the force flow in the area of the transmission device is interrupted. At the same time the pilot pressure in the area of the self-holding valve device drops, so that the self-holding valve device continues to be held in its first shift position against the control force only by the applied holding pressure signal.

In order to, at least to a limited extent, continue operation of a vehicle constructed with the transmission device in the event of a failure of the electric transmission control system, after a brief interruption of the pressure supply in the transmission device, for example produced by restarting of the drive machine of a vehicle drive-train that powers a hydraulic pressure source, such that the pressure holding signal applied to the self-holding valve decreases and as a result the self-holding valve is pushed by the control force to its second shift position, the force flow in the area of the transmission device can be restored by applying a pressure signal as a pilot pressure to the valve devices of at least two shifting elements of the transmission device that produce an actuating pressure, so that a gear ratio is engaged.

This is in part made possible by the fact that due to the failed electric transmission control system, even in the presence of a corresponding pressure supply, the self-holding valve device remains in its second shift position and the pressure signal is passed in the direction of the switching valve device, since no pilot pressure is applied to the self-holding valve device by the associated actor which sets the pilot pressure for the self-holding valve device.

When the driver adjusts the switching valve device to its first shift position, the pressure signal that is passed on by the self-holding valve device is applied as a pilot pressure to valve devices of at least two of the shifting elements of the transmission device that produce an actuating pressure, whereby, when a corresponding pressure supply is available, the two shifting elements are acted upon by the actuating pressure required for engaging the two shifting elements in the force flow of the transmission device, and the emergency gear desired for emergency driving operation of the vehicle is engaged in the transmission device.

In this case it does not matter whether the shifting elements associated with the valve devices acted upon by the pressure signal are, respectively, interlocking or frictional shifting elements. Thus, the choice of the emergency gear, which is used during emergency-running operation of a transmission device, is independent of the structure of a shifting element and an emergency gear concept can be designed in a simple manner.

The procedure according to the invention described above for achieving emergency-running operation of a transmission device having a plurality of electro-hydraulically actuated frictional and interlocking shifting elements is implemented in a simply designed manner by virtue of the self-holding valve device and the switching valve device that co-operates with it, wherein engagement of the emergency gear in the area of the transmission device is first preceded in time by the production of a defined operating condition in the transmission device, in which all the shifting elements are in their open operating condition.

In order to engage the emergency gear or emergency gear ratio in the transmission device that is required for the restricted operation of a vehicle, if the pilot control pressure is lower than a threshold value the self-holding function of the self-holding valve device has to be deactivated by decreasing a pressure holding signal applied to the self-holding valve device, whereby the self-holding valve device is pushed by the control force to its second shift position in which the pressure signal can be passed on in the direction of the switching valve device.

In simply designed embodiments of the mechanism according to the invention that can be operated with little control and regulation effort, the pressure holding signal and the pressure signal are identical and/or the control force acting on the self-holding valve device corresponds to the spring force of a spring system.

In an advantageous further development of the invention, if the driver has adjusted the switching valve device to a third shift position, the pressure signal can be applied to the actuating-pressure-producing valve devices of at least two further shifting elements as a pilot pressure, whereby a second emergency gear ratio, preferably for driving in reverse, can be obtained for the emergency operation of a transmission device.

If the switching valve device can be changed by a restoring force that acts in the direction of its second shift position to the second shift position, the emergency gear ratio engaged in the transmission device at the time can be disengaged with little control and regulation effort and the force flow in the area of the transmission device can be interrupted, for example during a parking operating condition of the transmission device.

If the restoring force acting on the switching valve device corresponds to a spring force of a spring system, then the emergency gear ratio can be disengaged particularly simply.

Both the characteristics specified in the claims and those indicated in the example embodiments of the mechanism according to the invention described below, whether considered in isolation or in any desired combination with one another, are suitable as further developments of the object according to the invention. In relation to such further development of the object according to the invention the respective combinations of characteristics do not imply any limitation, but are presented only as examples.

Further advantages and advantageous embodiments of the mechanism according to the invention emerge from the claims and from the example embodiments whose principle is described below with reference to the drawing. For the sake of clarity, the same indexes are used for components having the same structure and function in the description of the various example embodiments.

DETAILED DESCRIPTION OF THE PREFERRED EMBODIMENTS

Figures 1, 2:
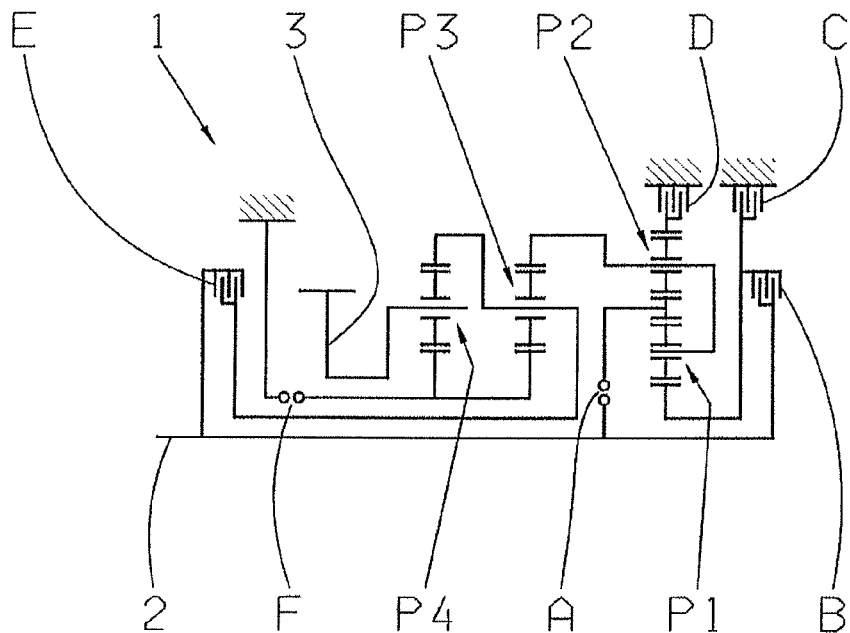
FIG. 1: A gear layout of a transmission device of planetary design with a plurality of interlocking and frictional shifting elements.
FIG. 2: A shifting scheme for the transmission device shown in FIG. 1.

FIG. 1 shows a gear layout of a transmission device 1 or multi-stage transmission, basically as known from DE 10 2008 000 429 A1. The transmission device 1 comprises a drive input shaft 2 and a drive output shaft 3, which when mounted in a vehicle is connected to a drive output of the vehicle whereas the drive input shaft 2 is functionally connected to a drive machine.

Furthermore, the transmission device 1 comprises four planetary gearsets P1 to P4, wherein the first and second planetary gearsets P1, P2, which are preferably made as minus planetary gearsets, form a shiftable intermediate gearset whereas the third and fourth planetary gearsets P3 and P4 form the main gearset. In addition the transmission device 1 comprises six shifting elements A to F, of which the shifting elements C, D and F are made as brakes and the shifting elements A, B and E as shifting clutches.

In accordance with the shifting logic shown in detail in FIG. 2, the shifting elements A to F enable the selective engagement of nine forward gears "1" to "9" and one reverse gear "R", such that to produce a force flow in the transmission device 1 essentially three shifting elements at a time have to in each case be brought to or held in a closed operating condition.

To obtain the fourth gear "4" for forward driving, only the shifting elements E and F have to be engaged in the force flow of the transmission device 1. To obtain the fourth gear ratio step "4", the shifting element A does not necessarily have to be engaged in the force flow of the transmission device 1. However, since the shifting element A has to be engaged in the force flow of the transmission device 1 to produce the gears "1" to "3" and "5" to "7", and since when in its engaged operating condition it does not have any effect on the behavior of the transmission device 1 when the fourth gear stage "4" is engaged, to simplify the operation of the transmission device 1 the interlocking shifting element A is left in its engaged operating condition even while the fourth gear "4" is engaged.

In the present case the shifting elements A and F are made as interlocking shifting elements with no additional synchronization in order, during the operation of the transmission device 1 and compared with transmission devices made only with frictional shifting elements, to reduce the drag torques caused by open frictional shifting elements. Since in general interlocking shifting elements can only be changed from a closed to an open operating condition within a very narrow operating condition window close to their load-free condition, the load-free operating condition of an interlocking shifting element to be disengaged is produced, in the absence of additional design measures, by appropriate actuation of the respective shifting elements involved in the shift. This applies in the case of both traction and thrust shifts, wherein the interlocking shifting elements can be in the form of claw clutches made with or without additional synchronization.

Figure 3:
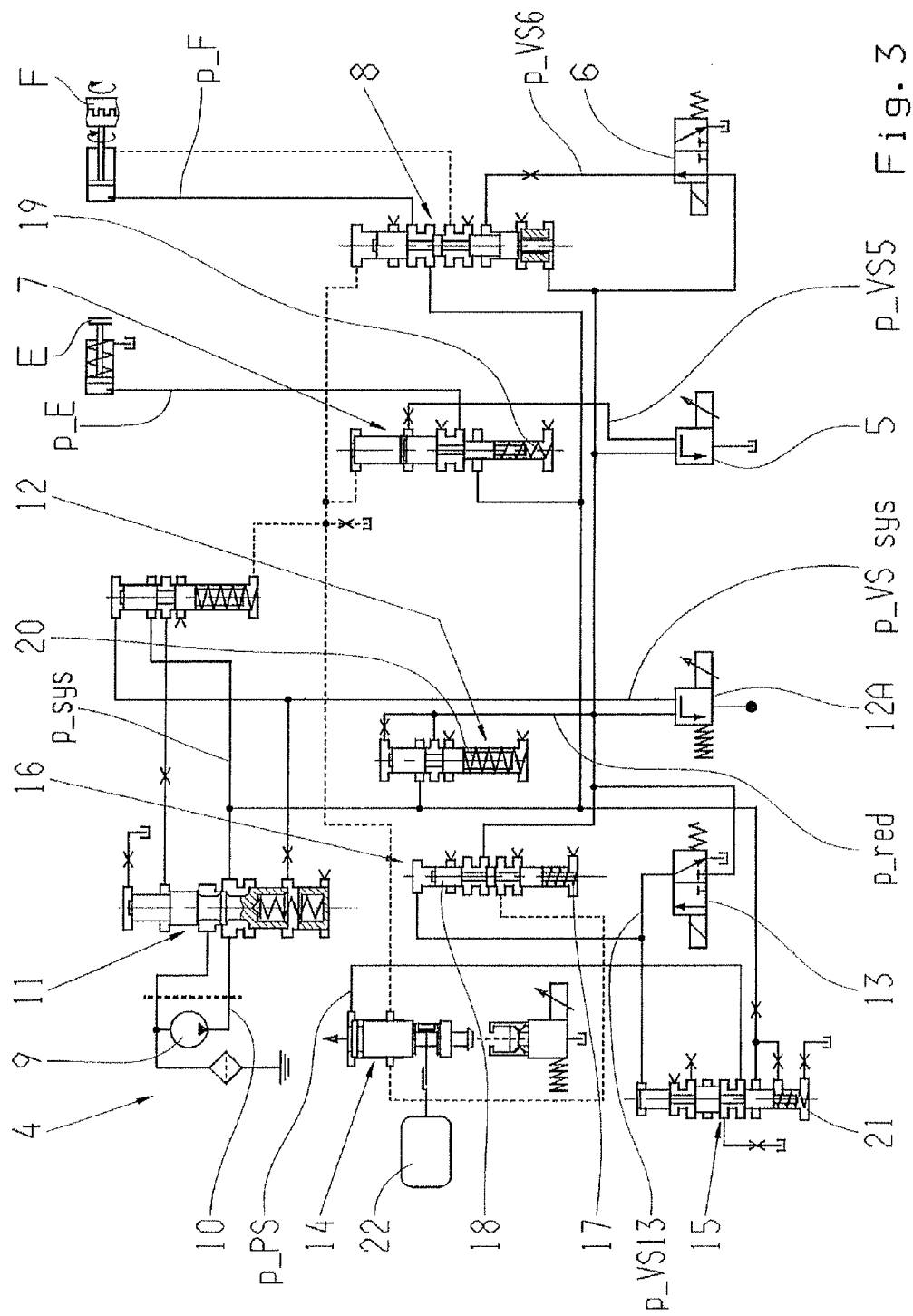
FIG. 3: A schematic illustration of a first embodiment of the mechanism according to the invention in a normal operating condition and with the parking lock engaged.

FIG. 3 shows a partial representation of a mechanism 4 in the form of a hydraulic shifting scheme for actuating the transmission device 1 or the electro-hydraulically actuated shifting elements A to F which, to obtain one of the gears "1" to "R" in the transmission device 1, can in each case be engaged in or disengaged from the force flow by applying an actuating pressure $p\_E$, $p\_F$. The actuating pressures $p\_E$, $p\_F$ of the shifting elements E, F and also the actuating pressures of the shifting elements A to D can be set in the area of the valve devices 7, 8 that can be acted upon by pilot pressures $p\_VS5$, $p\_VS6$ which can be produced by electrically actuated actors 5, 6, only the actors 5 and 6 associated with the shifting elements E and F and the valve devices 7 and 8 being shown in FIG. 3. As the control current in the actor 5 increases the pilot pressure $p\_VS5$ assumes values between a minimum value essentially equal to zero and a maximum value, while the pilot pressure $p\_VS6$ set by the actor 6, in this case in the form of a magnetic valve, is at its maximum value in a first shift position shown in FIG. 3 and, when the actor 6 is not energized so that the actor 6 is then in its second shift position, the pressure $p\_VS6$ is equal to zero. Thus, in each case the pilot pressures $p\_VS5$ and $p\_VS6$ adopt their respective minimum values when the actors 5 and 6 are not energized.

The mechanism 1 is supplied with pressure by a hydraulic pump 9 which is in this case powered by the drive machine of the vehicle drive-train built with the transmission device 1, which in a known manner is functionally connected to the drive input shaft 2 of the transmission device 1. A pressure side 10 of the hydraulic pump 9 is connected to a so-termed system pressure valve 11 designed as a pressure regulating valve and acted upon by a pilot pressure $p\_VSsys$ from an actor 12A, in order to produce in the mechanism 4 a required system pressure $p\_sys$ that depends on the operating condition at the time.

The system pressure $p\_sys$ is applied to a pressure-reducing valve 12 in this case designed as a pressure-limiting valve and in the area of which a reducing pressure $p\_red$ lower compared with the system pressure $p\_sys$ is set. The reducing pressure $p\_red$ is applied to the actors 12A, 5 and 6 and also to a further actor 13 in the form of a magnetic valve, and depending on the respective energizing in the area of the actors 5, 6, 12A and 13, is appropriately converted and switched through as a pilot pressure $p\_VS5$, $p\_VS6$, $p\_VSsys$ or $p\_VS13$ in the area of the valve devices 7, 8, 12A and a parking lock valve 15 associated with a parking lock cylinder 14.

The pilot pressure $p\_VS13$ that can be set in the area of the actor 13 is also provided for the pilot control of a self-holding valve device 16, in such manner that the self-holding valve device 16 can be switched over by the pilot pressure $p\_VS13$ against the spring force of a spring system to a first shift position. In the first shift position of the self-holding valve device 16 shown in FIG. 3 the reducing pressure $p\_red$ is applied in the area of a differential surface of a valve slide 18 of the self-holding valve device 16, whereby the valve slide 18 is also acted upon by a force component exerted in the direction of the first shift position of the self-holding valve device 16 and resulting from the reducing pressure $p\_red$. Depending on the size of the reducing pressure $p\_red$ at the time, the self-holding valve device 16 is held in its first shift position even if the pilot pressure $p\_VS13$ is equal to zero, so that the self-holding valve device 16 is designed with a pressure-dependent self-holding function which depends on the reducing pressure $p\_red$ or on a pressure signal equivalent to the reducing pressure $p\_red$.

During the operating condition of the mechanism 4 shown in FIG. 3 the hydraulic pump 9 provides a hydraulic pressure or corresponding pressure supply required for the functioning of the mechanism 4. The parking lock cylinder 14 is in a switched condition equivalent to an engaged operating condition of a parking lock and the shifting element E is in its open operating condition, whereas since the actor 6 is correspondingly energized the shifting element F is in its closed operating condition.

If a failure of an electric transmission control system (not shown in the drawing) occurs, the energizing of the actors 5, 6, 12A and 13 and also that of the actors associated with the further shifting elements A to D is interrupted, whereby the pilot pressures $p\_VS5$, $p\_VS6$, $p\_VSsys$ and $p\_VS13$ and also the pilot pressures for the further valve devices that set the actuating pressures for the shifting elements A to D in each case adopt their minimum values, which are essentially equal to zero. The result of this is that the valve devices 7, 12A and 15 and the valve devices associated with the other shifting elements A to D are in each case pushed by the respective spring systems 19 to 21 provided to their alternative shift positions, so that in this other shift position of the valve device 7 the shifting element E, and also the further shifting elements A to D, are acted upon by their respective associated valve devices with an actuating pressure equal to zero and they therefore change to an open operating condition.

Figure 4:
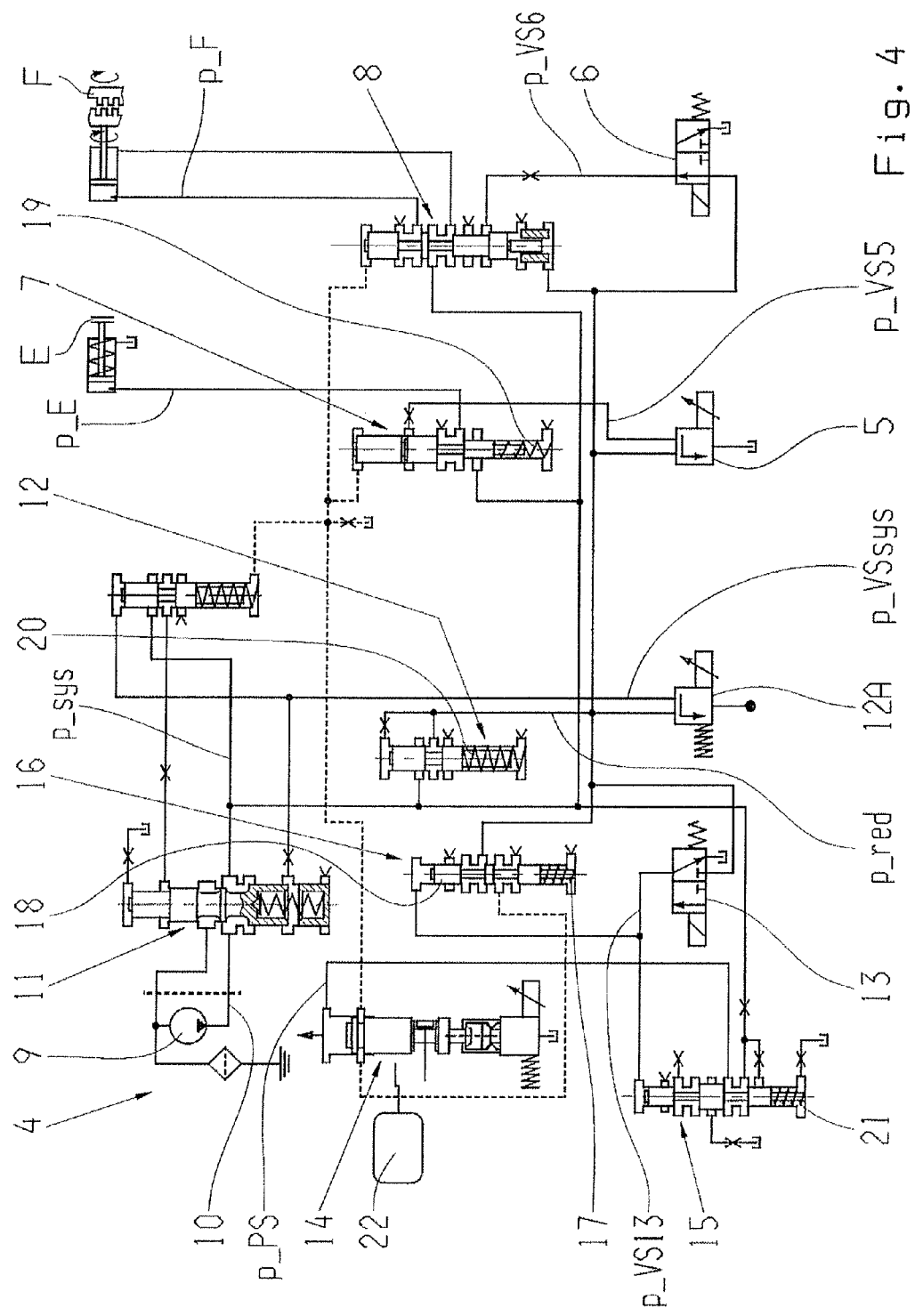
FIG. 4: The mechanism of FIG. 3, as represented in FIG. 3, in a second operating condition and with the parking lock disengaged and the self-holding function of a self-holding valve device activated.

FIG. 4 shows the mechanism 1 of FIG. 3 in an operating condition in which the self-holding valve device 16 is in its first shift position and the shifting elements E and F are fully open. At the same time, by hydraulic actuation of the parking lock cylinder 14 the parking lock is disengaged and the parking lock cylinder 14 is in a position equivalent to this. The electric transmission control system is fully functional, so the shifting elements E and F and also the other shifting elements A to D can be actuated or controlled in accordance with a driving program. In addition, the hydraulic pump 9 is supplying the hydraulic pressure required for the operation of the transmission device 1.

Figure 5:
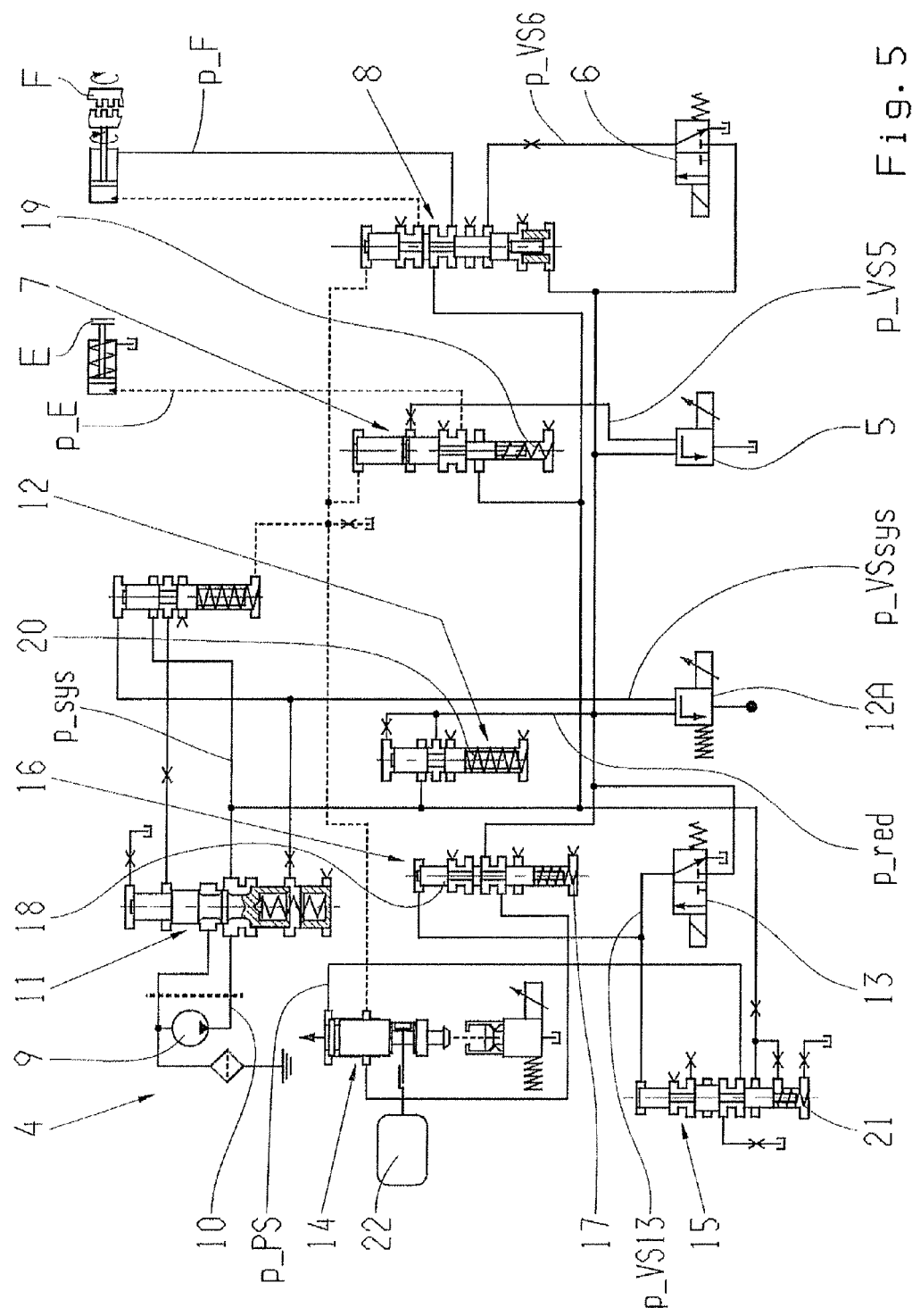
FIG. 5: The mechanism of FIG. 3, as represented in FIG. 3, in an emergency-running operating condition and with the parking lock engaged and the self-holding function of the self-holding valve device deactivated.

The representation of the mechanism 4 shown in FIG. 5 is based on an operating condition following a start of the drive machine of the vehicle drive-train, such that the parking lock is engaged and the two shifting elements E and F are in their open operating condition. By virtue of a correspondingly applied pilot pressure $p\_VS13$ the self-holding valve device 16 is in its second shift position, in which the pressure signal or reducing pressure p_red is passed on in the area of the self-holding valve device 16 in the direction toward the parking lock cylinder 14, and in which the self-holding function of the self-holding valve device 16 is deactivated.

Owing to the design of the self-holding valve device 16 with a self-holding function, and since the self-holding valve device 16 can only be changed from its second shift position shown in FIG. 5 to its first shift position shown in FIGS. 3 and 4 by the application of an appropriate pilot pressure p_VS13, it is ensured that if a functional fault occurs in the electric transmission control system due to which the energizing of the actors 5, 6, 12A and 13 and of the other actors not shown is interrupted, any shifting elements A to F of the transmission device 1 that are engaged first change to an open operating condition.

Since, despite the decreasing pilot pressure p_VS13, by virtue of its activated self-holding function the self-holding valve device 16 is held by the reducing pressure p_red in its first shift position, transmission of the reducing pressure p_red in the area of the self-holding valve device 16 toward the parking lock cylinder 14 is interrupted. Thus, it is ensured that if the electric transmission control system is not functioning, the transmission device 1 is first changed to its safe operating condition in which all the shifting elements A to F are open and a force flow in the area of the transmission device 1 is interrupted.

Figure 6:
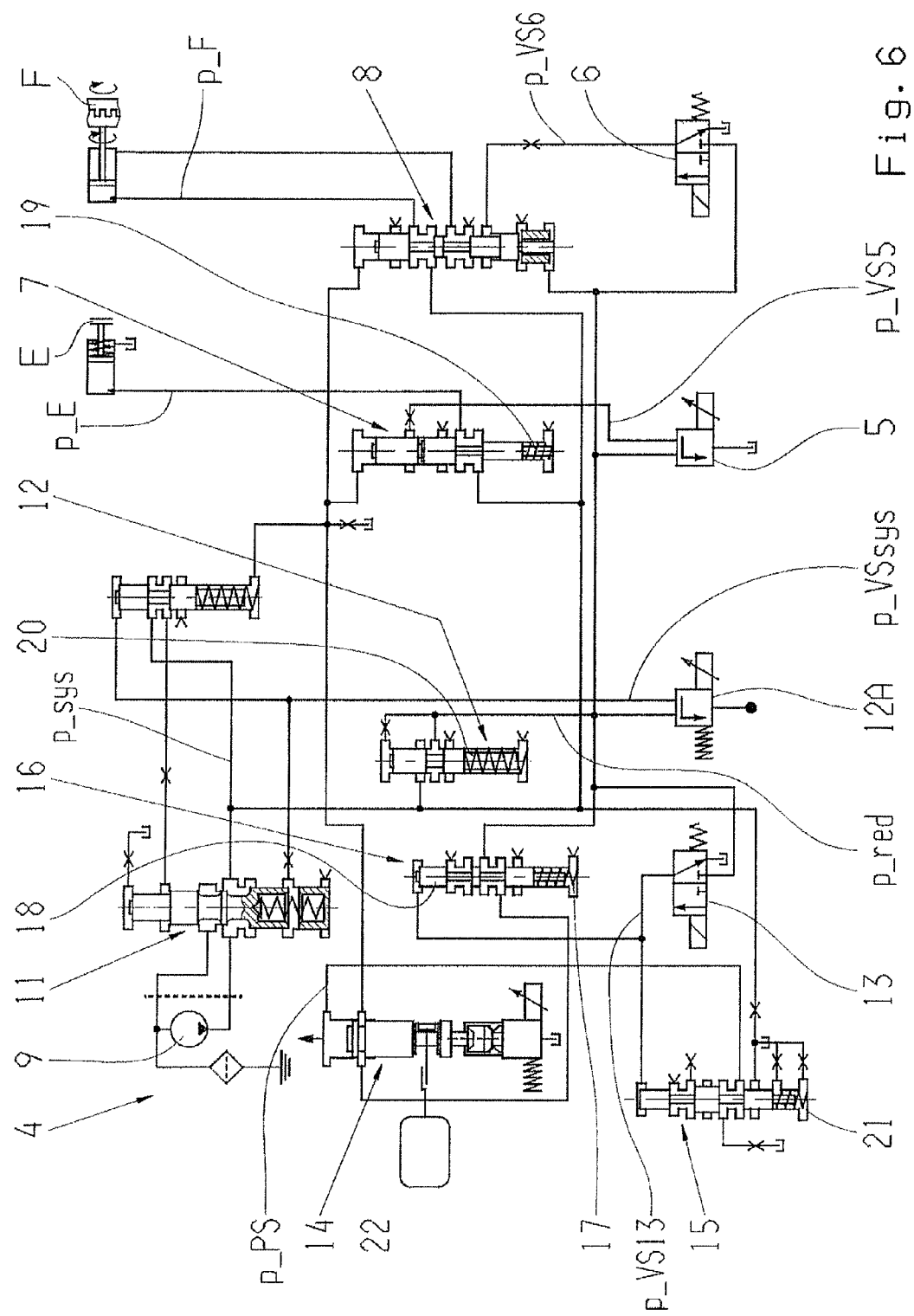
FIG. 6: The mechanism of FIG. 3 in the emergency-running operating condition with the parking lock disengaged and at the same time an emergency gear engaged.

To continue, at least to a limited extent, operating a vehicle built with the transmission device 1 even if the electric transmission control system has failed, the pressure supply to the mechanism 1 first has to be interrupted by switching off the drive machine in order to deactivate the self-holding function of the self-holding valve device 16 and to be able to move the self-holding valve device 16 or its valve slide 18, by means of the spring system 17, to the second shift position shown in FIGS. 5 and 6. When the drive machine is subsequently restarted the hydraulic pump 9 again delivers a corresponding hydraulic pressure, whereby the system pressure p_sys now fully transmitted in the area of the pressure reducing valve 12 is passed on in the area of the self-holding valve device 16 in the direction of the parking lock cylinder 14. Due to the second shift position of the switching valve device and parking lock cylinder 14 shown in FIG. 5, the reducing pressure p_red applied at the parking lock cylinder 14 is not passed on as a pilot pressure toward the valve devices 7 and 8. Thus, the shifting elements E and F are not at first acted upon by the actuating pressure required for the production of a force flow in the area of the transmission device 1.

To produce the force flow in the area of the transmission device 1 when the electric transmission control system has failed, and therefore without the actors 5, 6, 12A and 13 which are then not energized, the parking lock cylinder 14 is connected to an external, mechanical emergency-release system that can be actuated by a driver using a separate emergency-release mechanism 22. By means of the emergency-release system, driver's wish information can be provided mechanically to the transmission device 1 and can be used to enable the hydraulic emergency operation of the transmission device 1 and the mechanism 4. In this case the parking lock cylinder 14 is connected to the emergency-release mechanism 22 by means of a so-termed parking disk (not shown in the drawing).

If the electric transmission control system fails during the operation of a vehicle and the transmission device 1 changes to emergency operation, the parking lock is first held by the parking lock valve 15 in its switched position equivalent to the disengaged operating condition of the parking lock, as shown in FIGS. 4 and 6. When the drive machine has been stopped and the pressure supply by the hydraulic pump 9 has therefore been interrupted, in the manner described earlier the self-holding valve device 16 changes to its second shift position. At the same time, since there is no actuating pressure p_PS at the parking lock cylinder 14, the parking lock engages whereby the drive output is held in a rotationally fixed manner by the parking lock.

When the drive machine is subsequently restarted and there is consequently a pressure supply, the parking lock cannot be disengaged hydraulically since the necessary pilot pressure p_VS13 cannot be provided by the actor 13 during emergency operation. In the present case the motor can only be restarted when the parking operating condition or the neutral operating condition is engaged in the transmission device 1 while at the same time the drive output of the vehicle is static. In addition, the emergency-release mechanism 22 can also only be actuated by the driver when the drive output of the vehicle is static. However, the parking lock can be disengaged manually if the driver actuates the emergency-release mechanism 22 along with an associated displacement of the parking lock cylinder 14 and switching valve device from its second shift position toward its first shift position. At the same time, the pressure signal p_red transmitted in the area of the self-holding valve device 16 in the first shift position of the parking lock cylinder 14 is applied as a pilot pressure to the valve devices 7 and 8, and with the vehicle at rest the two shifting elements E and F are acted upon by the actuating pressure p_E and p_F required for their engagement. With the shifting elements E and F closed, the fourth gear "4" for forward driving is engaged in the transmission device 1 as the emergency gear and, in a known manner, the vehicle can be started by way of a hydrodynamic torque converter and moved, at least with limited power.

If the emergency-release mechanism is again actuated by the driver so as to engage the parking lock, the pressure signal p_red applied at the parking lock cylinder 14 is no longer passed on in the direction of the valve devices 7 and 8, so the actuating pressures p_E and p_F of the shifting elements E and F acting in the closing direction fall to zero and at least the shifting element E changes to its open operating condition and the force flow in the area of the transmission device 1 is interrupted.

In the case of the mechanism 4 shown in FIGS. 3 to 6 the control of the hydraulic systems and the parking lock mechanism during normal operation of the transmission device 1 and the associated electric transmission control system takes place exclusively electrically. By means of the emergency-release mechanism 22 that can be actuated manually by the driver, respectively a parking operating condition in which the parking lock is engaged and operating conditions in which the parking lock is in each case disengaged and, for example, forward driving is possible, can be obtained. In addition, analogously to a ratcheted selector lever, the emergency-release mechanism 22 is made for example with a shift-lock magnet or a blocking device by which, for example, brake actuation for actuating the emergency-release mechanism 22 is prevented.

FIGS. 7 to 10 show a second example embodiment of a mechanism 4 for actuating the transmission device 1, in which an indication of driver's wish regarding an operating condition of the transmission device 1 during normal operation of the transmission device 1 is conveyed by the driver mechanically, by way of a selector slide 23, toward the transmission device 1 and also the mechanism 4. The selector slide 23 can be moved by the driver to four discrete selector lever positions D, N, R and P, such that in the selector lever position D, when the electric transmission control system is in its normal operating condition, the gears "1" to "9" for forward driving can be engaged in the transmission device 1. In the selector lever position N, the transmission device 1 is shifted to its neutral operating condition, while in the selector lever position R, the gear "R" for reversing is engaged. In the selector lever position "P", the force flow in the area of the transmission device 1 is interrupted by appropriate engagement and disengagement of the shifting elements A to F and the parking lock is engaged.

Figure 8:
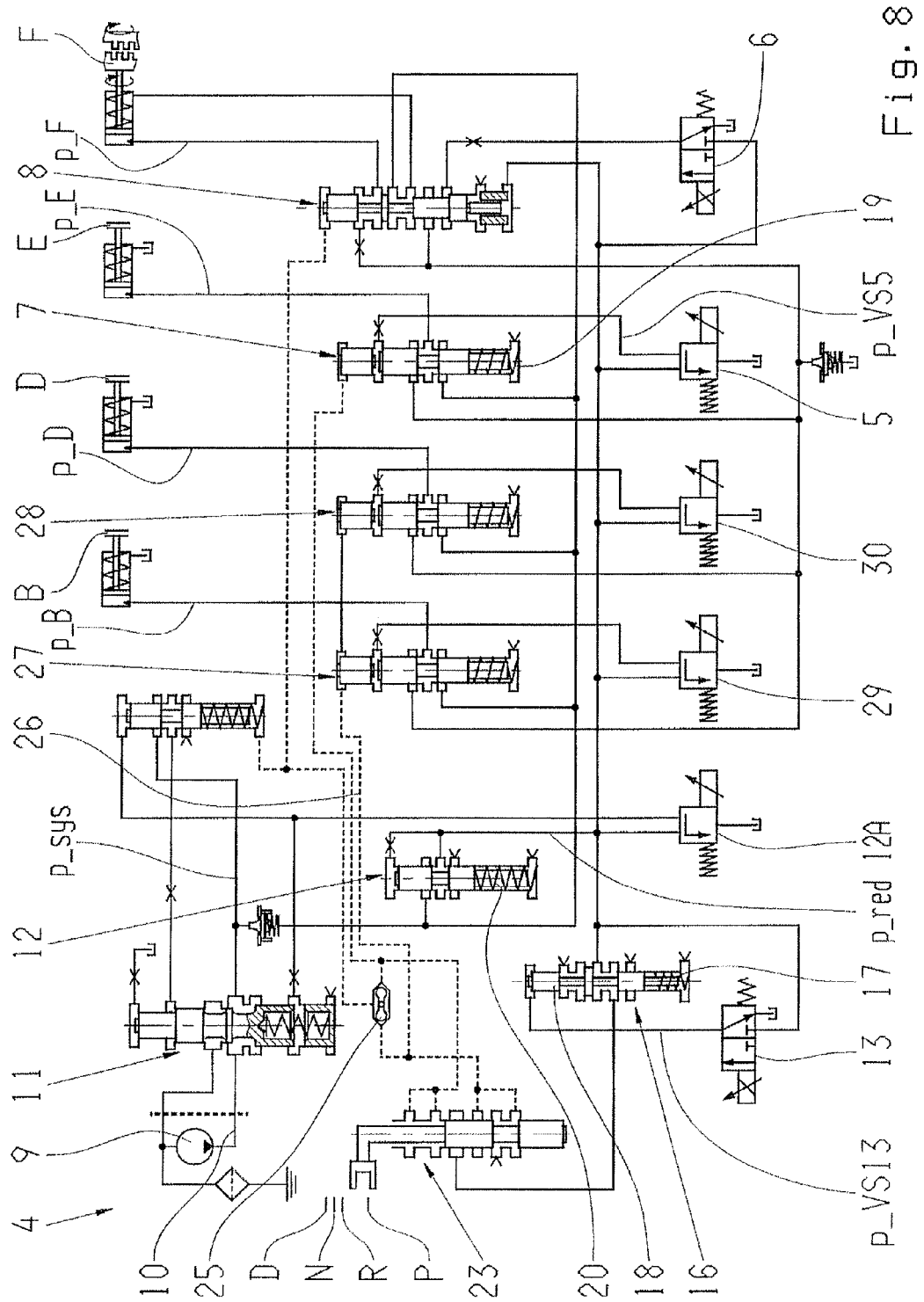
FIG. 8: The mechanism of FIG. 7 in an emergency-running operating condition and with the parking lock engaged, such that the self-holding function of the self-holding valve device is activated and a force flow in the transmission device of FIG. 1 is interrupted.
Figure 9:
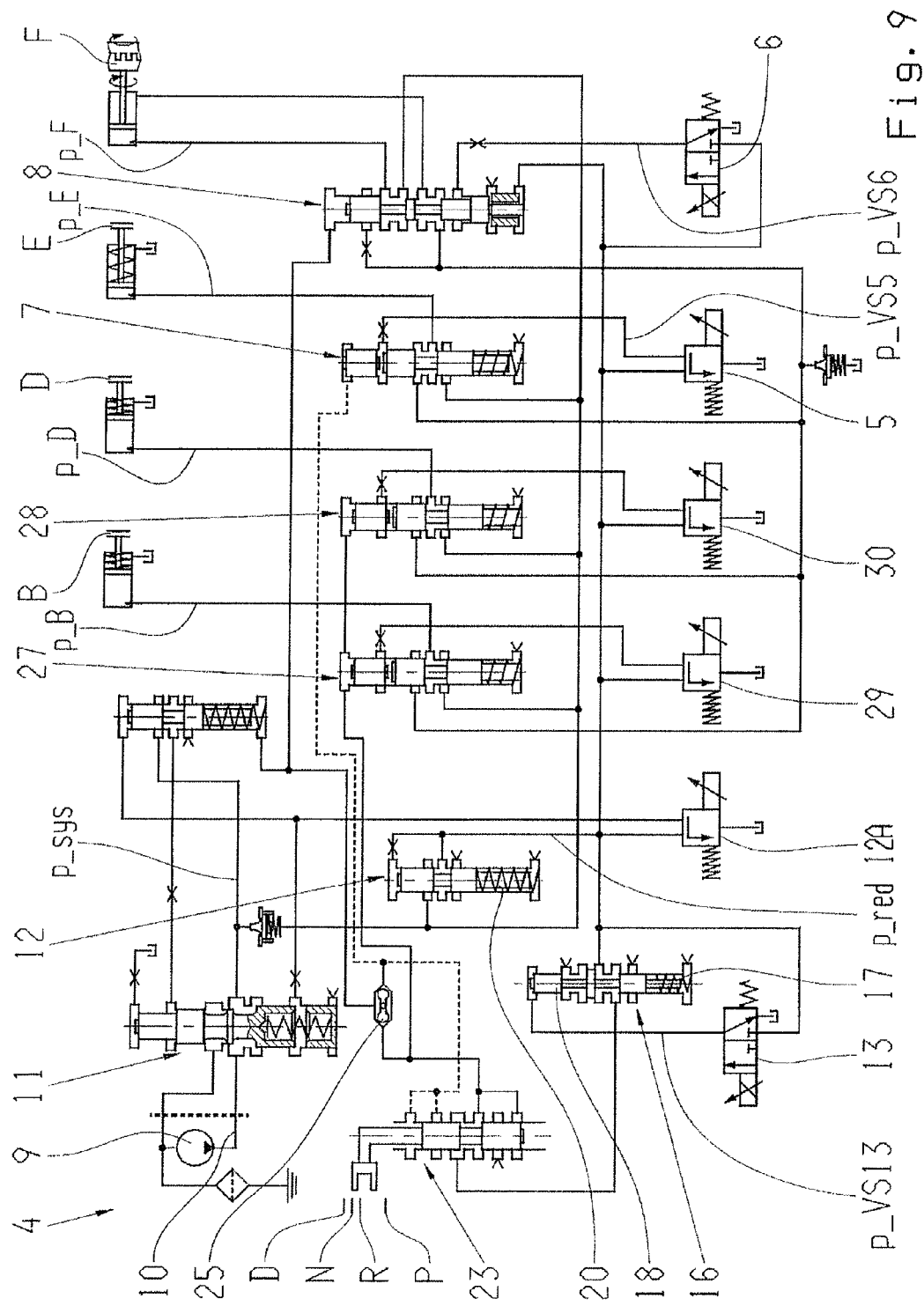
FIG. 9: The mechanism of FIG. 7 in an emergency-running operating condition and with the parking lock disengaged, such that in the transmission device according to FIG. 1 an emergency gear for reversing is engaged.
Figure 10:
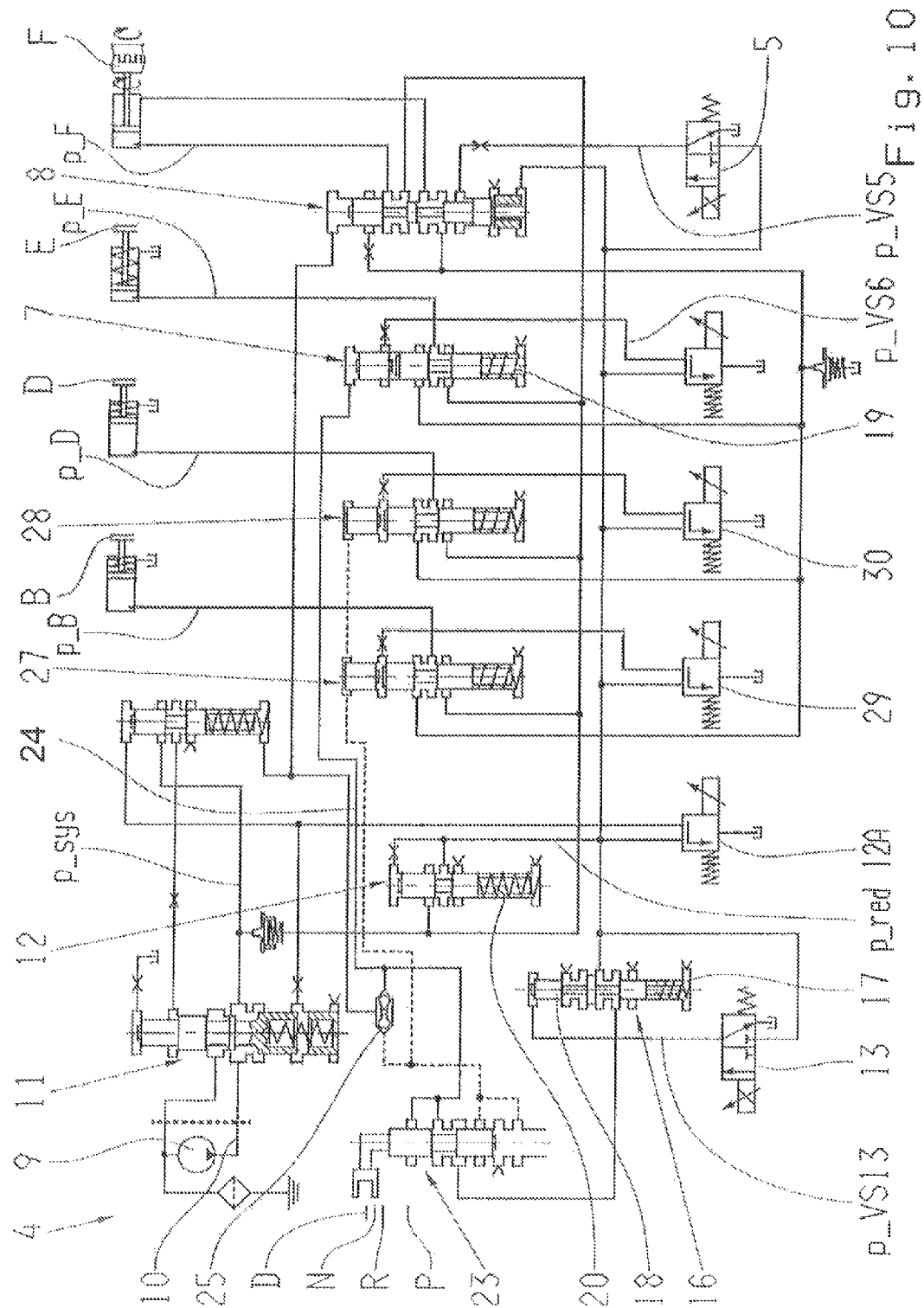
FIG. 10: The mechanism of FIG. 7 in the emergency-running operating condition with the parking lock disengaged, and at the same time with an emergency gear for forward driving engaged in the transmission device of FIG. 1.

Like the mechanism 4 in FIGS. 3 to 6, the mechanism 4 of Figs. 7 to 10 is made with the self-holding valve device 16, which is designed to function essentially in the same way as the self-holding valve device 16 of the mechanism 1 in FIGS. 3 to 6, that is, having a self-holding function. In the second shift position shown in FIGS. 8 to 10, the pressure signal or pressure holding signal p_red in the area of the self-holding valve device 16 can be passed on in the direction of the selector slide 23. The pressure signal p_red is not applied at the selector slide 23 in the first shift position of the self-holding valve device 16 of the mechanism 4 in FIG. 7. As illustrated in FIG. 10, when the transmission device 1 is in emergency operation and the selector slide is in position D, the pressure signal p_red is passed, by way of a line 24, directly to the valve device 7 as a pilot pressure, whereby the shifting element E is acted upon with the actuating pressure required to produce the emergency gear "4". At the same time the valve device 8 is acted upon via an 'OR' valve 25 by the pressure signal switched through in the area of the self-holding valve device 16 and the selector slide 23 as a pilot pressure, and the shifting element F is acted upon with the actuating pressure required to obtain its closed operating condition.

Figure 7:
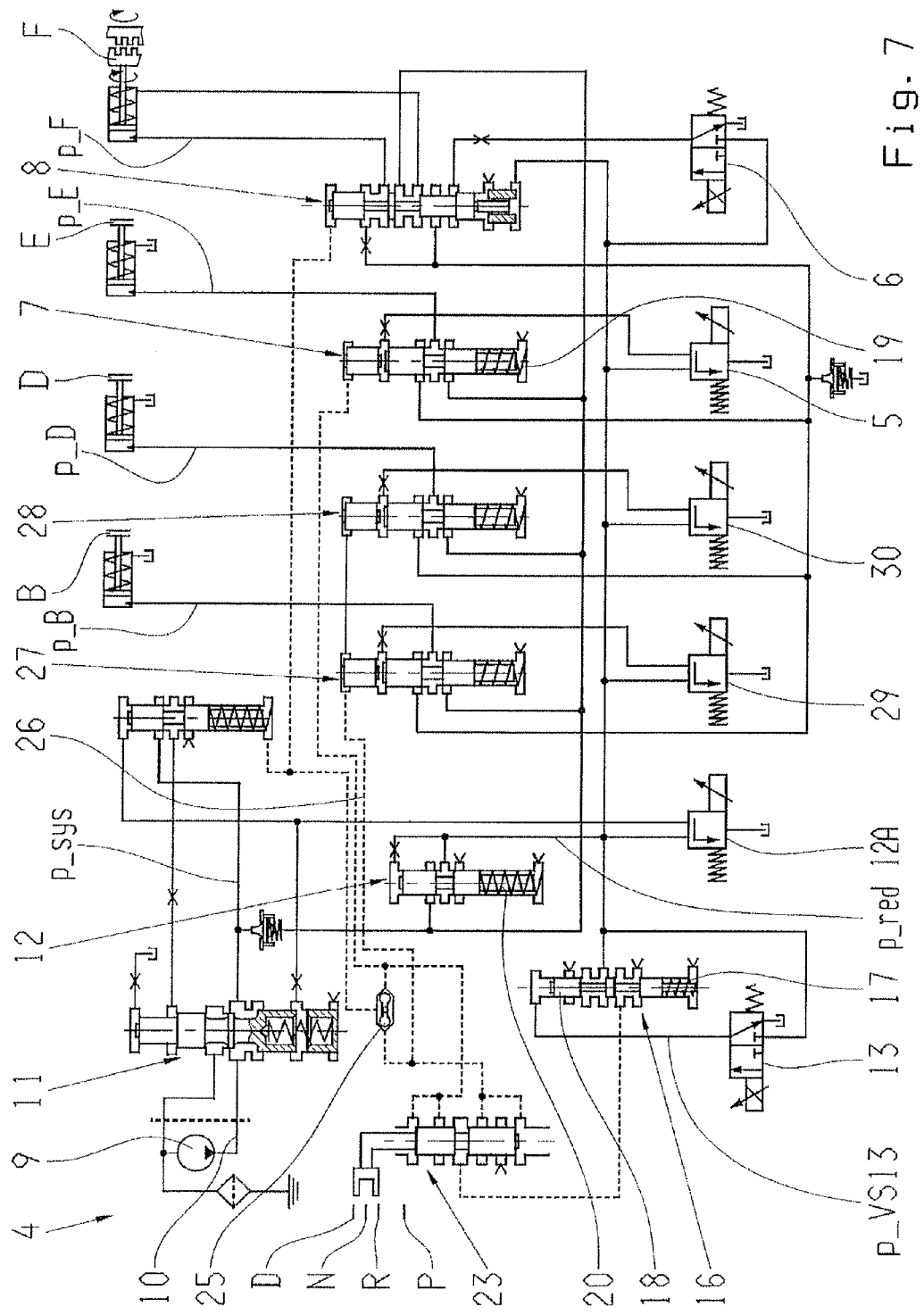
FIG. 7: A second embodiment of the mechanism according to the invention, represented as in FIG. 3 in the normal operating condition, such that the transmission device according to FIG. 1 is in a neutral operating condition.

The operating condition of the mechanism 4 on which the representation in FIG. 7 is based corresponds to a normal operating condition of the transmission device 1 and also of the electric transmission control system, in which the selector slide 23 is in its N position. The self-holding valve device 16 is in the self-holding condition and the shifting elements B, D, E, F are disengaged from the force flow by appropriate energizing of the actors 5 and 6 as well as further actors 29 and 30, i.e. they are in an open operating condition. The emergency operating condition of the mechanism 4 on which the representation in FIG. 8 is based, is characterized in that, similar to the operating condition shown in FIG. 7, the mechanism 4 is supplied with pressure by the hydraulic pump 9, whereas, dissimilar to the operating condition, the selector slide 23 is in its P position. Also dissimilarly, the self-holding valve device 16 is in its second shift position and the shifting elements B, D, E and F are open.

If during emergency operation of the transmission device 1, the driver shifts the selector slide 23 to its position N or P, the onward passage of the pressure signal p_red in the area of the selector slide 23 is interrupted and the force flow in the area of the transmission device 1 is cut off.

If during emergency operation the selector slide 23 is in its R position, as shown in FIG. 9, the pressure signal p_red is switched through the self-holding valve device 16, and then is passed on by way of the selector slide 23 and a line 26 as a pilot pressure to valve devices 27 and 28, in the area of which, respectively, an actuation pressure p_B and p_D of the shifting elements B and D can be produced. In addition, the pressure signal p_red is passed on via the 'OR' valve 25 in the direction of the valve device 8 associated with the shifting element F, whereby the shifting elements B, D and F change to their closed operating condition and the gear "R" for reversing is engaged as the emergency gear in the transmission device 1.

FIGS. 11 to 14 show a third embodiment of the mechanism 4, in which as the switching valve device a hydraulic valve 31 that can be actuated mechanically from the driver's seat, for example by means of a Bowden cable, is provided, in the area of which the pressure signal p_red switched through when the self-holding function of the self-holding valve device 16 is deactivated can be passed on as a pilot pressure toward the valve devices 7 and 8.

Figure 11:
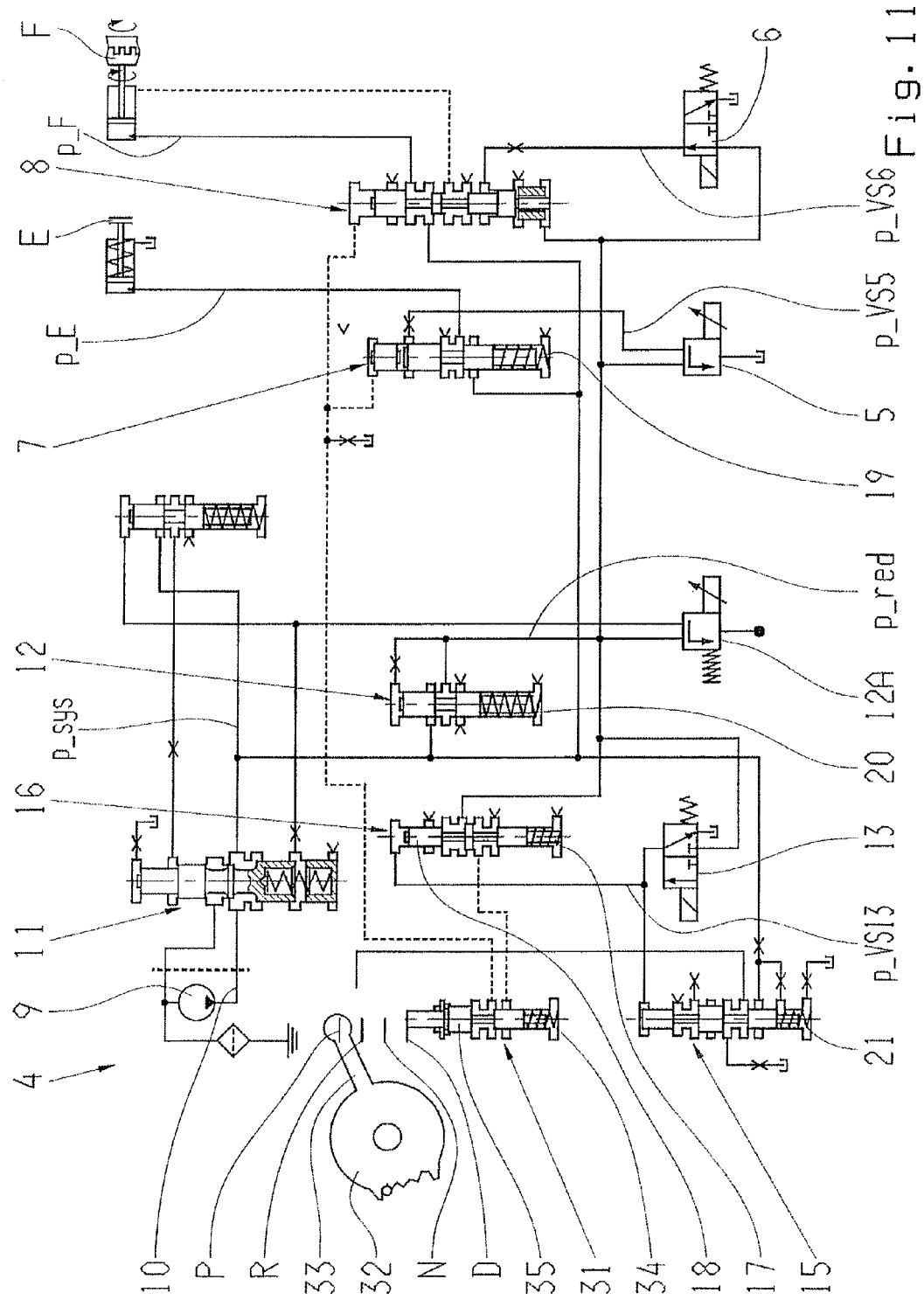
FIG. 11: A representation as in FIG. 3 of a third embodiment of the mechanism according to the invention in the normal operating condition and with the parking lock engaged.

In the operating condition of the mechanism 4 on which FIG. 11 is based, the valve 31 is in a shift position that corresponds to a parked operating condition of the transmission device 1, such that an operating element 32 or selector slide that can be actuated manually by the driver is also in an operating condition which corresponds to the parked operating condition of the transmission device 1. The shifting element E is disengaged, whereas the shifting element F is engaged electrically by corresponding actuation of the actor 6 by the transmission control system.

Figure 12:
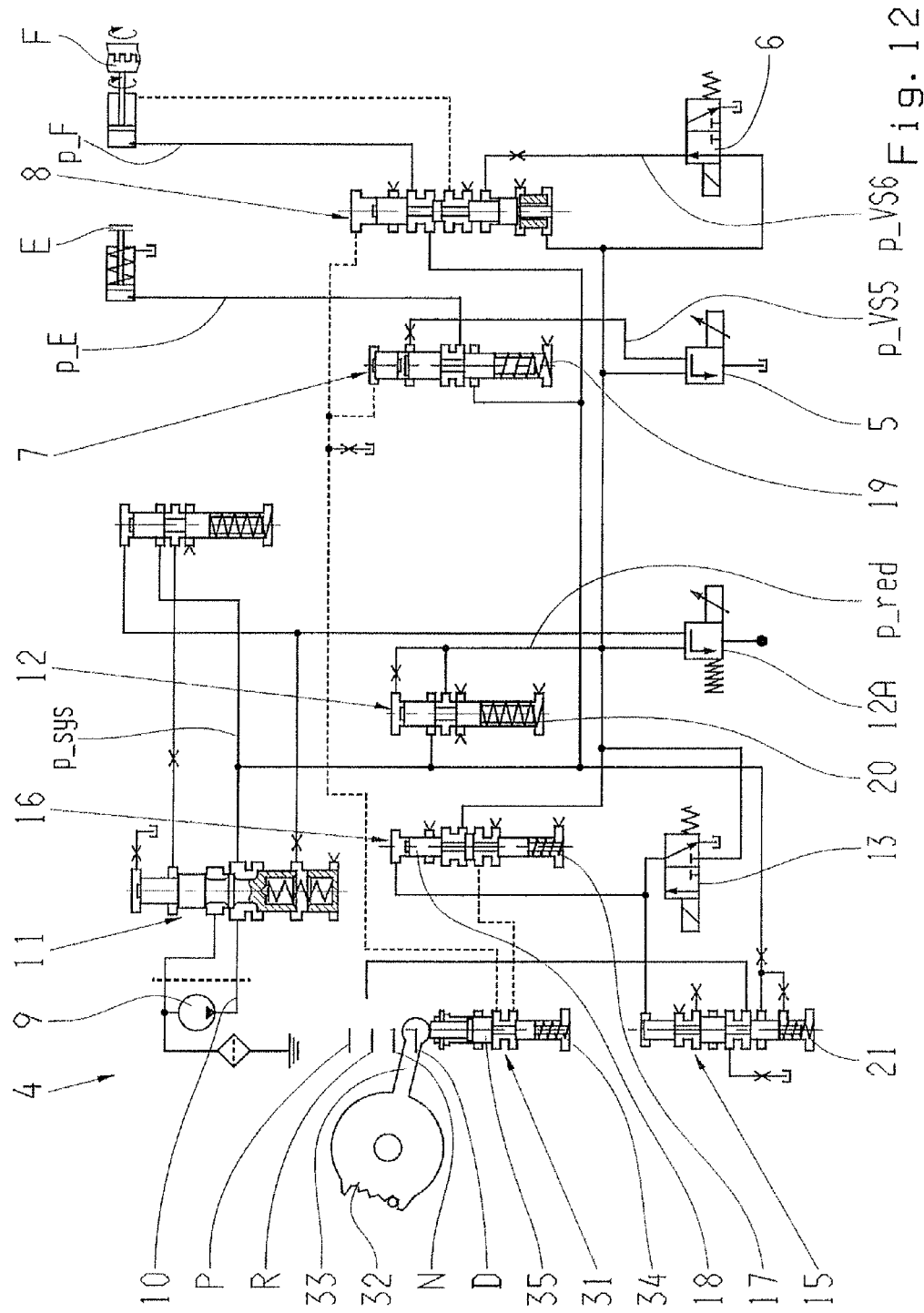
FIG. 12: The mechanism of FIG. 11 in the normal operating condition and at the same time with the parking lock disengaged and a gear ratio stage for forward driving engaged in the transmission device of FIG. 1.
Figure 13:
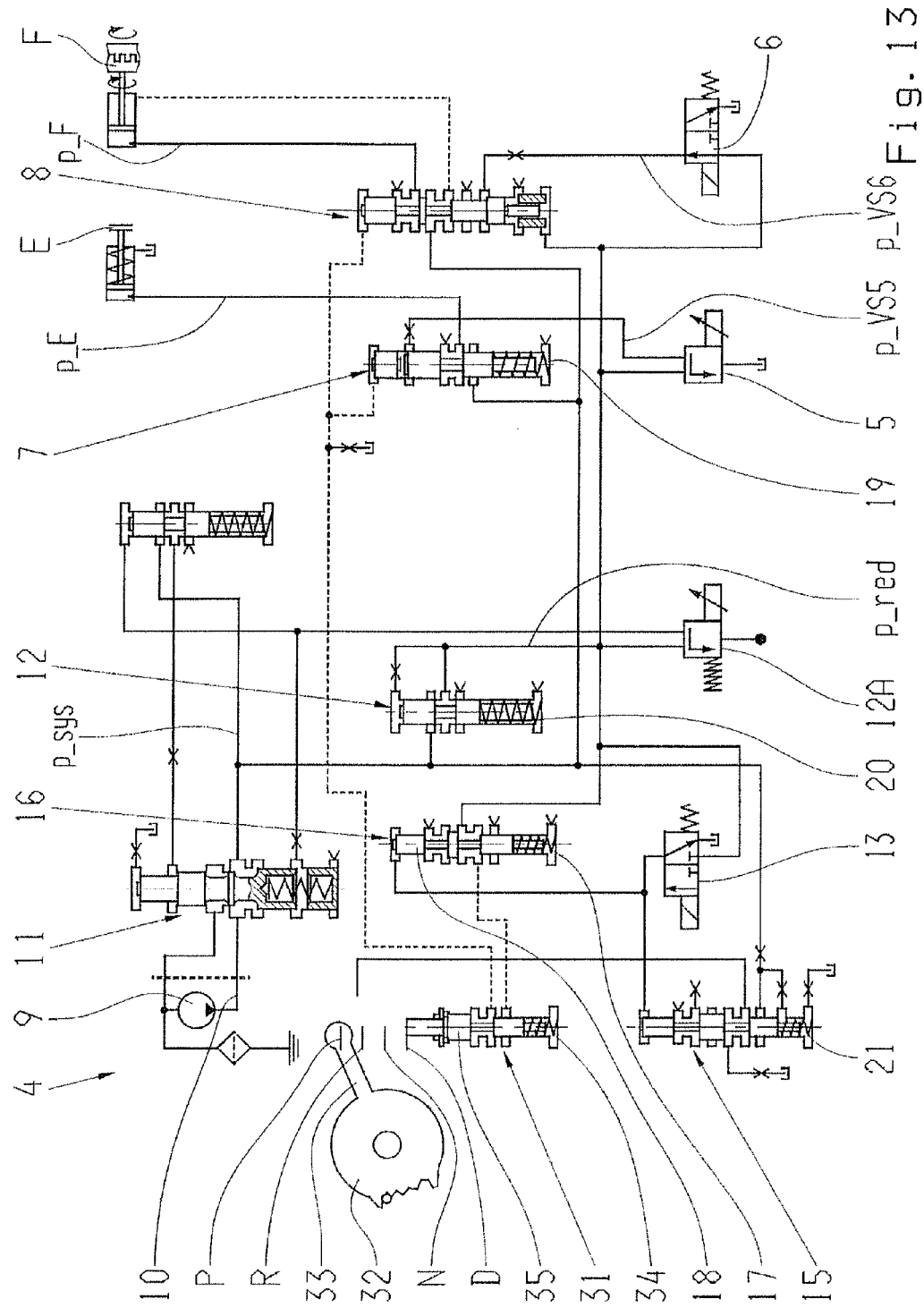
FIG. 13: The mechanism of FIG. 11 in the emergency-running operating condition, with the parking lock engaged and at the same time with the self-holding function of the self-holding valve device deactivated, such that the force flow is interrupted in the transmission device of FIG. 1.
Figure 14:
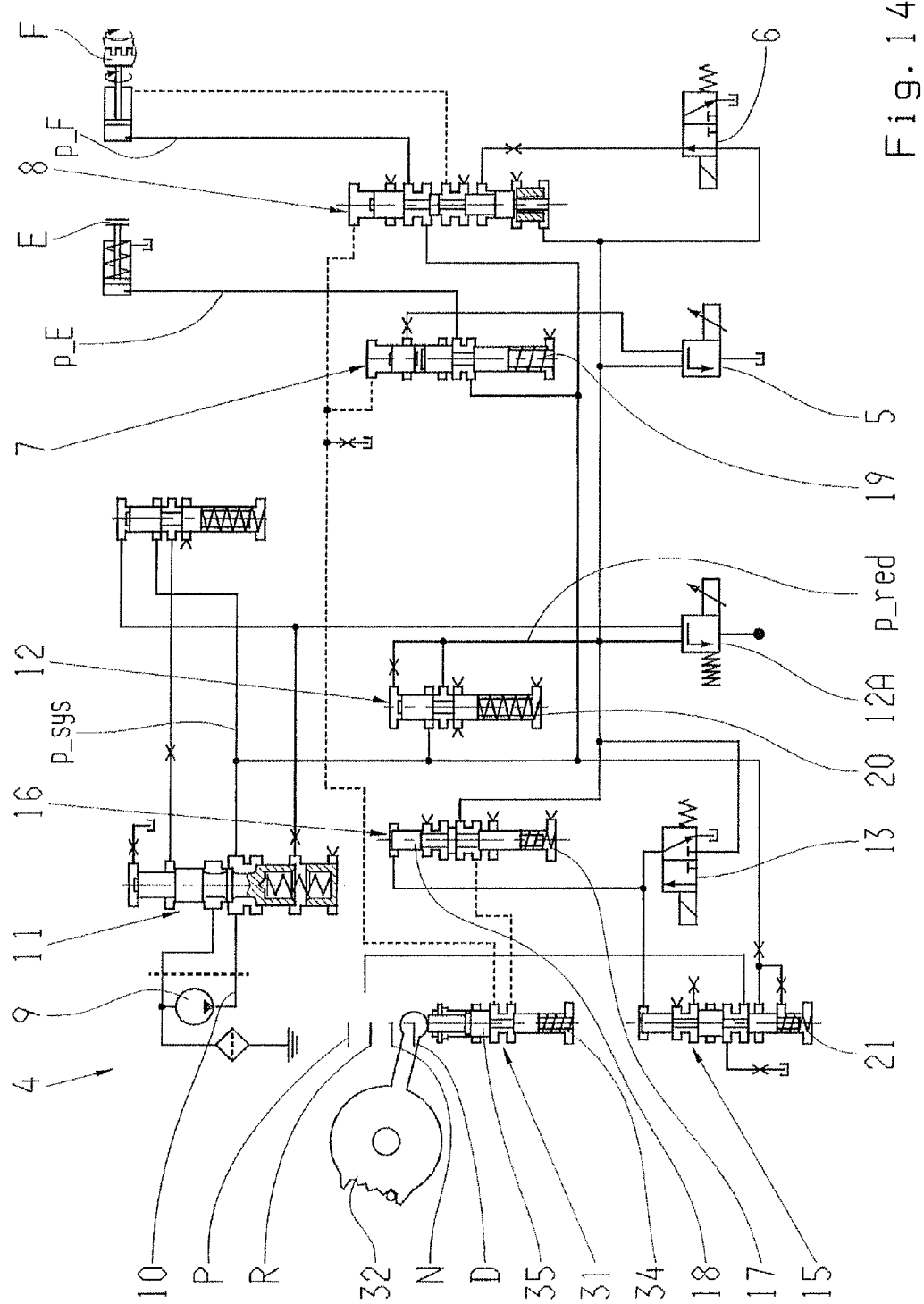
FIG. 14: The mechanism of FIG. 11 in the emergency-running operating condition, with the parking lock disengaged and at the same time with an emergency gear for forward driving engaged in the transmission device of FIG. 1.

In the operating condition of the mechanism 4 on which the representation in FIG. 12 is based, the hydraulic pump 9 supplies the hydraulic pressure required for operating the transmission device 1. By means of the selector slide the operating condition for forward driving is called for in the transmission device 1, whereby the valve 31 too is changed to its shift position equivalent to the selector slide position D. As before the self-holding valve device 16 is in its first shift position and is held there by the pressure holding signal p_red as described for FIGS. 3 to 6, so that the pressure signal p_red is not passed on in the direction of the valve 31.

If the electric transmission control system fails, the pilot pressures p_VS5 and p_VS6 fall essentially to zero and the shifting elements E and F, like the further shifting elements A to D, change to their open operating condition, whereby the force flow in the area of the transmission device 1 is safely interrupted.

In order to enable a vehicle built with the transmission device 1 to be driven in the forward direction at least to a limited extent, as in the two previously described embodiments of the mechanism 4, the pressure supply to the mechanism 4 first has to be interrupted by switching off the drive machine of the vehicle drive-train and thus also cutting off the delivery from the hydraulic pump 9. The result of the pressure drop in the area of the mechanism 4 at the same time as the interruption of energizing current to the actors 5, 6, 12A and 13 is that the self-holding valve device 16 is pushed by the spring system 17 to its second shift position shown in FIG. 13, in which the self-holding function is deactivated regardless of the pressure holding signal applied at the time.

As with the two previously described variants of the mechanism 4, so too with the mechanism 4 shown in FIGS. 11 to 14, the drive machine of the drive-train built with the transmission device 1 can only be restarted when the driver moves the selector slide 32 to the selector slide position P. If the drive machine is started and if the energizing of the actors 5, 6, 12A and 13 by the electric transmission control system is interrupted, the self-holding valve device 16 remains in its second shift position since the pilot pressure p_VS13 required for pushing over the self-holding valve device 16 is not available in this operating condition of the electric transmission control system. The result is that when pressure is again supplied by the hydraulic pump to the mechanism 4, the pressure signal p_red is applied at the self-holding valve device 16 and, in the second shift position of the self-holding valve device 16, is switched through toward the valve 31.

If the driver wants to move the vehicle in the forward driving direction, to do this he must shift the selector slide 32 from its position P to its position D for forward driving.

During this a lever element 33 of the selector slide 32 comes in contact with an end of a valve slide 35 of the valve 31 remote from a spring system 34 and pushes the valve slide 35, against the spring force of the spring system 34, to its shifted first shift position in which the pressure signal p_red in the area of the self-holding valve device 16 is again applied as a pilot pressure to the valve devices 7 and 8 and the two shifting elements E and F change to their closed operating condition in order to obtain the fourth gear "4" as the emergency gear.

As an alternative to actuating the valve 31 by means of the selector slide 32, the hydraulic system of the transmission device 1 can also be coupled by mechanical action from the driver's seat, for example via a Bowden cable, to a hydraulic valve that can be actuated, i.e. in this case the valve 31, which the driver can actuate either at any time or only during emergency operation.

If the transmission device 1 begins operating in the emergency mode, the pilot pressures of the valve devices associated with the shifting elements A to F are all cut off together and the force flow in the area of the transmission device 1 is interrupted.

Once the pressure supply has been interrupted the self-holding function of the self-holding valve device 16 is deactivated and the self-holding valve device 16 changes to its second shift position. When the motor is restarted and the pressure supply is therefore restored again, the shifting element F is immediately brought to its engaged position by the build-up of hydraulic pressure. By virtue of the above-described manual actuation of the valve 31 by the driver, for example when the driver moves the selector slide 32 to its D position, a pressure duct that branches off from the valve 31 toward the two valve devices 7 and 8 is acted upon by the pressure signal p_red and the shifting element E is engaged, whereby the fourth gear "4" is engaged in the transmission device 1 as the emergency gear and a vehicle built with the transmission device 1 can continue being driven.

INDEXES

1 Transmission device
2 Drive input shaft
3 Drive output shaft
4 Mechanism
5, 6 Actor
7, 8 Valve device
9 Hydraulic pump
10 Pressure side
11 System pressure valve
12 Pressure-reducing valve
12A Actor
13 Actor
14 Parking lock cylinder
14 Parking lock valve
16 Self-holding valve device
17 Spring system
18 Valve slide
19 to 21 Spring devices
22 Emergency release mechanism
23 Selector slide
24 Line
25 'OR' valve
26 Line
27, 28 Valve device
29, 30 Actor
31 Valve
32 Selector slide
33 Lever element
34 Spring device
35 Valve slide
"1" to "9" Gears for forward driving
"R" Gear for reversing
A to F Shifting elements
D Selector slide position for the forward driving operating condition of the transmission device
N Selector slide position for a neutral operating condition of the transmission device
P Selector slide position for the parked operating condition of the transmission device
p_B Actuating pressure
p_D Actuating pressure
p_E Actuating pressure
p_F Actuating pressure
p_red Pressure signal, pressure holding signal
p_PS Actuating pressure
p_sys System pressure
p_VS Pilot pressure
P1 to P4 Planetary gearset
R Selector slide position for the reversing operating condition of the transmission device The invention claimed:

1. A mechanism (4) for actuating a transmission device (1) during a normal operation and during an emergency operation after failure of an electric transmission control system, the mechanism comprising:
   a plurality of electro-hydraulically actuated shifting elements (A to F) which, to obtain a gear ("1" to "9", "R") in the transmission device (1), being either engagable in a force flow or disengagable therefrom by applying at least one of a plurality of actuating pressures (p_B, p_D, p_E, p_F);
   at least one of the plurality of elecrotro-hydraulically actuated shifting elements (A to F) being an interlocking shifting element, and at least a second one of the plurality of electro-hydraulically actuated shifting elements (A to F) being a frictional shifting element;
   each of the plurality of actuating pressures (p_B, p_D, p_E, p_F) being produced by at least one of a plurality of valve devices (7, 8, 15, 16, 27, 28);
   at least one of the plurality of valve devices (7, 8, 15, 16, 27, 28) being acted upon by at least one of a plurality of pilot pressures (p_VS5, p_VS6, p_VSsys, p_VS13);
   the plurality of pilot pressures (p_VS5, p_VS6, p_VSsys, p_VS13) being produced by electrically actuated actors (5, 6, 12A, 13, 29, 30) such that, as control currents through the actors (5, 6, 12A, 13, 29, 30) increase, the plurality of pilot pressures (p_VS5, p_VS6, p_VSsys, p_VS13) adopt values between a minimum value and a maximum value such that, when:
      the plurality of pilot pressures (p_VS5, p_VS6, p_VSsys, p_VS13) are at their respective minimum values, the respective shifting elements (A to F) are disengaged; and
      the plurality of pilot pressures (p_VS5, p_VS6, p_VSsys, p_VS13) are at their respective maximum values, the respective shifting elements (A to F) are engaged;
   during a non-energized operating condition of the actors (5, 6, 12A, 13, 29, 30), the pluratily of pilot pressures (p_VS5, p_VS6, p_VSsys, p_VS13) each adopt their respective minimum values;
   one of the plurality of valve devices (7, 8, 15, 16, 27, 28) being a self-holding valve device (16) that is acted upon by a first pilot pressure (p_VS13) of the plurality of pilot pressures (p_VS5, p_VS6 ,p_VSsys, p_VS13), and by a pressure holding signal (p_red), both the first pilot pressure (p_VS13) and the pressure holding signal (p_red) acting in a direction of a first shift position;

the self-holding valve device (16) being moved by the first pilot pressure (p_VS13) to the first shift position, against a control force that acts in a direction of a second shift position, and the self-holding valve device (16) being held in the first shift position by the pressure holding signal (p_red) against the control force;

such that onward passage of a further pressure signal (p_red) in a direction toward a switching valve device (14; 23; 31) may be switched during an emergency operation from:
being blocked in the first shift position of the self-holding valve device (16), and
being applicable to the switching valve device (14; 23; 31) in the second shift position of the self-holding valve device (16);

a first shift position of the switching valve device (14; 23; 31) being set by a driver, during which the further pressure signal (p_red) being applied as a second pilot pressure of the plurality of pilot pressures to further valve devices (27, 28, 7, 8) of the plurality of valve devices (7, 8, 15, 16, 27, 28) that produce at least two of the plurality of actuating pressures (p_B, p_D, p_E, p_F) of at least two of the shifting elements (B, D, F; E, F); and a second shift position of the switching valve device (14; 23; 31) being set by the driver, during which onward passage of the further pressure signal (p_red) being blocked in the direction toward the further valve devices (27, 28, 7, 8) that produce at least two of the plurality of actuating pressures (p_B, p_D, p_E, p_F) of the at least two of the shifting elements (B, D, F; E, F).

2. The mechanism according to claim 1, wherein the pressure holding signal (p_red) and the further pressure signal (p_red) are identical to one another.

3. The mechanism according to claim 1, wherein the control force which acts on the self-holding valve device (16) is a spring force of a spring system (17).

4. The mechanism according to claim 1, wherein the switching valve device (14; 23; 31) is movable to the second shift position by a restoring force (17) that acts in the direction toward the second shift position.

5. The mechanism according to claim 4, wherein the restoring force acting upon the switching valve device (14; 23; 31) is a spring force of a spring system (17).

6. The mechanism according to claim 1, wherein the switching valve device (14; 23; 31) is a parking lock cylinder (14) of a parking lock which is coupled to an operating element (22) that is actuatable by the driver.

7. The mechanism according to claim 1, wherein the switching valve device (14; 23; 31) is functionally connectable with a selector slide (32) that is actuatable by the driver.

8. The mechanism according to claim 1, wherein the further pressure signal (p_red) corresponds to a supply pressure (p_sys) for the plurality of shifting elements (A to F).

9. The mechanism according to claim 1, wherein the pressure holding signal (p_red) corresponds to one of the pluralily of actuating pressures of a respective one of the plurality shifting elements (A to F).

10. A mechanism (4) for actuating a transmission device (1) during a normal operation and during an emergency operation after failure of an electric transmission control system, the mechanism comprising;

a plurality of electro-hydraulically actuated shifting elements (A to F) which, to obtain a ear ("1" to "9", "R") in the transmission device (1) being either engagable in a force flow or disengagable therefrom by applying one of a plurality of actuating pressures (p_B, p_D, p_E, p_F);

at least one of the plurality of electro-hydraulically actuated shifting elements (A to F) being an interlocking shifting element, and at least a second one of the plurality of electro-hydraulically actuated shifting elements (A to F) being a frictional shifting element;

each of the plurality of actuating pressures (p_B, p_D, p_E, p_F) being produced by at least one of a plurality of valve devices (7, 8, 15, 16, 27, 28);

at least one oft the plurality of valve devices (7, 8, 15 16, 27, 28) being acted upon by at least one of a plurality of pilot pressures (p_VS5 p_VS6, p_VSsys, p_VS13);

the plurality of pilot pressures (p_VS5, p_VS6, p_VSsys, p_VS13) being produced by electrically actuated actors (5, 6, 12A, 13, 29, 30) such that, as control currents through the actors (5, 6, 12A, 13, 29, 30) increase the plurality of pilot pressures (p_VS5, p_VS6, p_VSsys, p_VS13) adopt values between a minimum value and a maximum value such that, when:
the plurality of pilot pressures (p_VS5, p_VS6, p_VSsys, p_VS13) are at their respective minimum values, the respective shifting elements (A to F) are disengaged;
the plurality of pilot pressures (p_VS5, p_VS6, p_VSsys, p_VS13) are at their respective maximum values, the respective shifting elements (A to F) are engaged, and
in a non-energized operating condition of the actors (5, 6, 12A, 13, 29, 30), the plurality of pilot pressures (p_VS5, p_VS6, p_VSsys, p_VS13) each adopt their respective minimum values;

one of the plurality of valve devices being a self holding valve device (16) that is acted upon by a first pilot pressure (p_VS13) of the plurality of pilot pressures, and by a pressure holding signal (p_red), both the first pilot pressure (p_VS13) and the pressure holding signal (p_red) acting in a direction of a first shift position;

the self-holding valve device (16) being moved by the first pilot pressure (p_VS13) to the first shift position, against a control force that acts in a direction of a second shift position, and the self-holding valve device (16) being held in the first shift position by the pressure holding signal (p_red) against the control force;

such that onward passage of a further pressure signal (p_red) in a direction toward a switching valve device (14; 23; 31) may be switched, during an emergency operation, from:
being blocked to the switching valve device (14; 23; 31) in the first shift position of the self-holding valve device (16), and
beinq applicable to the switching valve device (14; 23; 31) in the second shift position of the self-holding valve device (16);

a first shift position of the switching valve device (14; 23; 31) being set by a driver, during which the further pressure signal (p_red) being applied as a second pilot pressure of the plurality of pilot pressures to further valve devices (27, 28, 7, 8) of the plurality of valve devices (7, 8, 15, 16, 27, 28) that produce the actuating pressure (p_B, p_D, p_E, p_F) of at least two of the shifting elements (B, D, E, F); and a second shift position of the switching valve device (14; 23; 31) being set by a driver, during which onward passage of the further pressure signal (p_red)in the direction toward the further valve devices (27, 28, 7, 8)

that produce the actuating pressures p_B, p_D, p_E, p_F) of the at least two shifting elements (B, D, E, F) is blocked;

wherein if the driver sets the switching valve device (14; 23; 31) in a third shift position, the further pressure signal (p_red) is applied, as one of the plurality of pilot pressures, to the further valve devices (27, 28, 8) of the at least two further shifting elements (B, D, F) that produce the actuating pressure (p_B, p_D, p_F).

11. A mechanism (4) for actuating a transmission device (1) during a normal operation and during an emergency operation after failure of an electric transmission control system, the mechanism comprising:

electro-hydraulically actuated shifting elements (A to F) which, to obtain a gear ("1" to "9", "R") in the transmission device (1), being either engagable in a force flow or disengagable therefrom by applying actuating pressures (p_B, p_D, p_E, p_F);

at least one of the electro-hydraulically actuated shifting elements (A to F) being an interlocking shifting element, and at least a second one of the electro-hydraulically actuated shifting elements (A to F) being a frictional shifting element;

the actuating pressures (p_B, p_D, p_E, p_F) being produced by the valve devices (7, 8, 15, 16, 27, 28) and the valve devices (7, 8, 15, 16, 27, 28) being acted upon by the pilot pressures (p_VS5, p_VS6, p_VSsys, p_VS13);

the pilot pressures (p_VS5, p_VS6, p_VSsys, p_VS13) being produced by electrically actuated actors (5, 6, 12A, 13, 29, 30) such that, as control currents through the actors (5, 6, 12A, 13, 29, 30) increase, the pilot pressures (p_VS5, p_VS6, p_VSsys, p_VS13) each adopt respective values between a respective minimum value and a respective maximum value such that:

the shifting elements (A to F) are disengaged when the respective pilot pressures (p_VS5, p_VS6, p_VSsys, p_VS13) are at their respective minimum values, the shifting elements (A to F) are engaged when the respective pilot pressures (p_VS5, p_VS6, p_VSsys, p_VS13) are at their respective maximum values, and the pilot pressures (p_VS5, p_VS6, p_VSsys, p_VS13) each adopt their respective minimum values during a non-energized operating condition of the actors (5, 6, 12A, 13, 29, 30);

one of the valve devices is a self-holding valve device (16) that is acted upon in a first direction by a first one of the pilot pressures and by a pressure holding signal (p_red), and in a second direction by a control force;

during an emergency operation, onward passage of the pressure signal (p_red) in a direction toward a switching valve device (14; 23; 31) may be switched from:

being blocked to the switching valve device (14; 23; 31) by a first shift position of the self-holding valve device (16), and being applicable to the switching valve device (14; 23; 31) by the second shift position of the self-holding valve device (16);

when the pressure signal (p_red) is applicable, the self-holding valve device (16) facilitates the further pressure signal (p_red) being applied as a second one of the pilot pressures to further valve devices (27, 28, 7, 8) to produce the actuating pressure (p_B, p_D, p_E, p_F) of at least two of the shifting elements (B, D, F; E, F), during a first shift position of the switching valve device (14; 23; 31) being set by a driver; and when the pressure signal (p_red) is blocked, the self-holding valve device (16) facilitates blocking the onward passage of the further pressure signal (p_red) in the direction toward the further valve devices (27, 28, 7, 8) that produce the actuating pressures (p_B, p_D, p_E, p_F) of the shifting elements (B, D, F; E, F) during a second shift position of the switching valve device (14; 23; 31) being set by the driver.

12. The mechanism according to claim 1, wherein the self-holding valve device (16) is held in its first shift position even if the pilot pressure (p_VS13) has a value equal to zero, so that the self-holding valve device (16) is designed with a pressure-dependent self-holding function.

* * * * *